US009942354B1

(12) United States Patent
Thompson et al.

(10) Patent No.: US 9,942,354 B1
(45) Date of Patent: Apr. 10, 2018

(54) MANAGING SERVICE MESSAGE RATES IN A COMPUTING SERVICE ENVIRONMENT

(71) Applicant: Amazon Technologies, Inc., Seattle, WA (US)

(72) Inventors: Jonathan Paul Thompson, Seattle, WA (US); Ryan Paul Green, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 15/084,438

(22) Filed: Mar. 29, 2016

(51) Int. Cl.
*G06F 15/16* (2006.01)
*H04L 29/08* (2006.01)
*H04L 12/26* (2006.01)

(52) U.S. Cl.
CPC ........ *H04L 67/327* (2013.01); *H04L 43/0876* (2013.01); *H04L 67/2804* (2013.01)

(58) Field of Classification Search
None
See application file for complete search history.

(56) References Cited

U.S. PATENT DOCUMENTS

| | | | | |
|---|---|---|---|---|
| 7,130,912 B2* | 10/2006 | Nishikado | ............... | H04L 67/42 709/225 |
| 9,405,597 B1* | 8/2016 | Luff | .......................... | G06F 9/54 |
| 9,703,980 B2* | 7/2017 | Luff | .......................... | G06F 9/54 |
| 2003/0188013 A1* | 10/2003 | Nishikado | ............... | H04L 67/42 709/238 |
| 2014/0189065 A1* | 7/2014 | van der Schaar | ....... | H04L 67/32 709/219 |
| 2016/0103618 A1* | 4/2016 | Iliadis | ................... | G06F 3/0611 711/154 |
| 2016/0149981 A1* | 5/2016 | van der Schaar | ....... | H04L 67/32 709/219 |
| 2016/0328573 A1* | 11/2016 | Luff | .......................... | G06F 9/54 |
| 2017/0351873 A1* | 12/2017 | Luff | ........................ | G06F 21/44 |

* cited by examiner

*Primary Examiner* — Moustafa M Meky
(74) *Attorney, Agent, or Firm* — Thorpe North & Western, LLP

(57) ABSTRACT

A technology is provided for message rate management for a service in computing service environment. An allowable rate of service message requests to be received at a first service that are received from a one or more services in a group of services executing in a computing service environment may be defined. A current rate of service message requests received by the first service from the one or more services in the group of services may be monitored. The current rate of service message requests may be compared to the allowable rate of API service message requests. A message may be sent to the one or more services from the group of services, according to the comparison, to adjust service message requests sent to the first service from the one or more services.

20 Claims, 9 Drawing Sheets

MANAGING SERVICE MESSAGE RATES IN A COMPUTING SERVICE ENVIRONMENT

BACKGROUND

Computing systems may be found in the workplace, at home, or at school. Computing systems may include computing and data storage systems to process and store data. Some computing system have begun offering centralized virtual computing options that may reduce overall costs, improve availability, improve scalability, and reduce time to deploy new applications. For example, some computing systems may act as a service that provides virtual computing, virtual storage, virtual networking and other virtual services as purchased for variable periods or on a pay-per-use basis (e.g., pay for a certain amount of API (application program interface) transactions or bandwidth) from large pools of re-purposable, multi-tenant computing resources or services. However, challenges may arise when one or more systems are present and sending service message requests to a service may cause a delay in response time, delay in processing in the computing service, or impact some other aspect of the computing system. Thus, the performance, efficiency, and quality of the computing service may be negatively impacted.

DETAILED DESCRIPTION

This technology relates to providing computing systems and resources for message rate management for services in a service provider environment of a computing system. In one aspect, a customer's device or an application may be configured to make requests to a web enabled service, which may provide a variety of services to the customer, the application, or other services. The customer's device or application may communicate with the service via an interface, such as an application programming interface (API), which may be a web services interface or any other type of API service.

The present technology provides for defining an allowable rate of service message requests, such as API calls, to be received at the receiving service from one or more other services, such as a group of federated services, executing in a computing service environment. A current rate of service message requests received at the service from the group of other services may be monitored. The current rate of service message requests may be compared to an allowable rate of API service message requests. A message may be sent to the one or more sending services (i.e., calling services) in the group of services, according to the comparison to adjust a volume of service message requests sent to the receiving service from the one or more sending services.

In one aspect, the present technology provides for defining an allowable rate of service message requests at a receiving service from a group of sending services executing in the service provider environment. The current rate of service message requests may be compared to the allowable rate of service message requests for the receiving service. Feedback may be provided to one or more sending services in the group of sending services according to the comparison, and a request may be made to the sending service(s) to adjust the current rate of service message requests (e.g., to request a decrease or possibly an increase) sent to the receiving service from the one or more sending services. In one aspect, the feedback may be used in order to throttle up and/or throttle down the current rate of service message requests sent to the receiving service from the one or more services.

Figure 1:
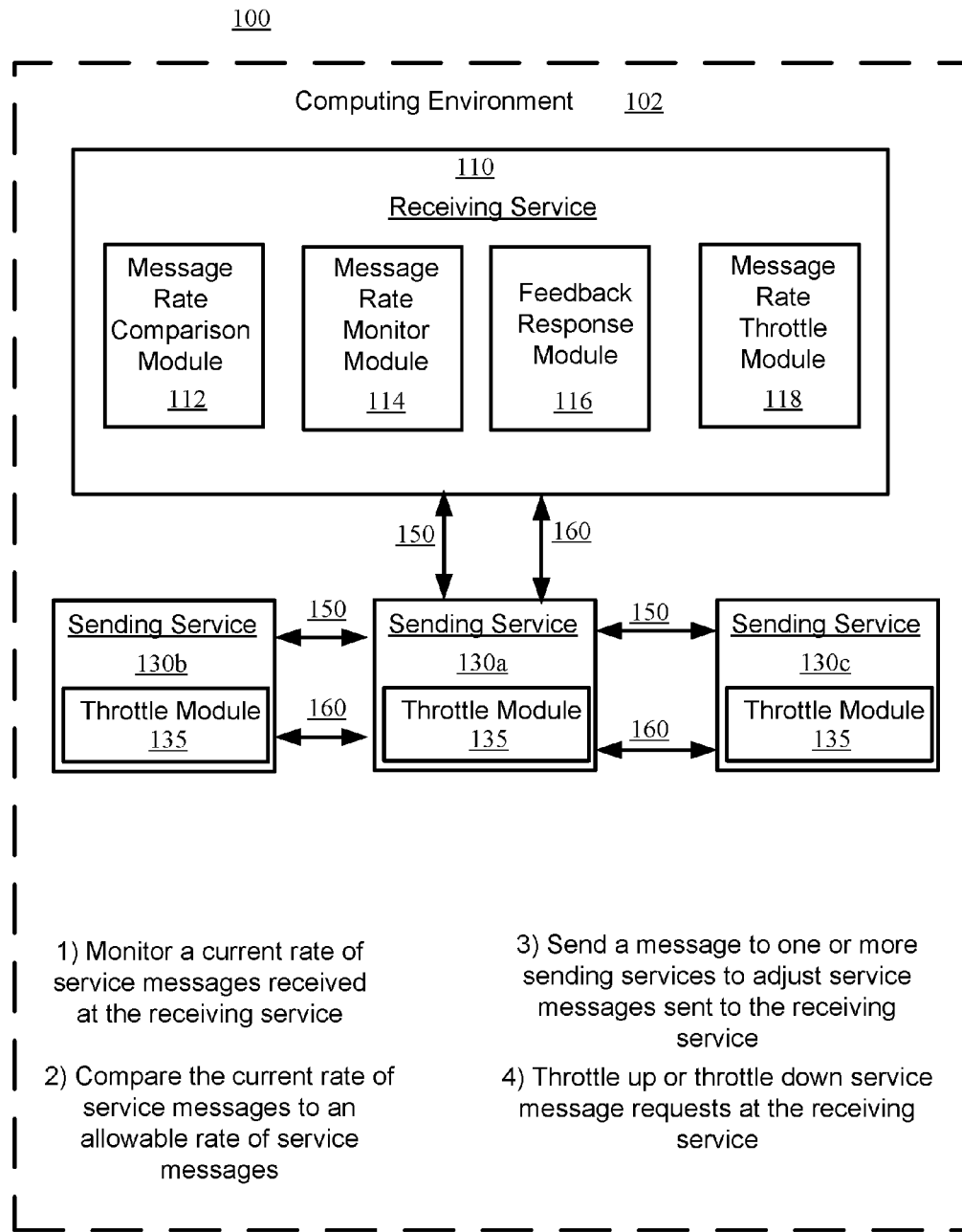
FIG. 1 illustrates a system for managing a rate of service messages for services in a service provider environment according to an example of the present technology.

FIG. 1 illustrates a system 100 for managing a rate of service messages in a service provider environment according to an example of the present technology. The system 100 may include one or more sending services (illustrated in FIG. 1 as 130*a-c* and may be individually and/or collectively referred to as "130"), a receiving service (aka "an observer service") 110, and a service provider environment 102, which may provide virtualized computing services (i.e., virtualized computing, virtualized storage, virtualized networking, etc.) to the sending services 130 (e.g., customers) and receiving service. More specifically, the service provider environment 102 may provide virtualized computing, virtualized storage, virtualized networking and other virtualized services that are executing on a hardware substrate. Also, the service provider environment 102 may provide data communication between the one or more sending services 130 and receiving service 110 by way of the network 125 that may include a virtual network that is within the service provider environment 102 or other suitable networks, etc. The service provider environment 102 may include the receiving service 110 and one or more sending services 130. The receiving service 110 may include a message rate comparison module 112, a message rate monitor module 114, a feedback response module 116, and/or a message rate throttle module 118.

It should be noted that in one aspect, the receiving service 110 may be included within the service provider environment 102 and/or remotely located from the service provider environment 102. Also, one or more sending services 130 may be included within the service provider environment 102 and/or remotely located from the service provider environment 102. In one aspect, the receiving service 110 may provide a service message request rate management functionality in service provider environment 102. The service provider environment 102 is illustrated with a dotted line because the services may operate within a service provider environment or the services may operate as independent services outside of a service provider environment.

The sending services 130 may be a group of services, such as a group of federated services. Each sending service 130 may also include a throttle module 135 for throttling up and/or throttling down a number of service message requests (e.g., API calls) sent to the receiving service 110 or other sending services 130. In one alternative configuration, each sending service 130 may be directly connected to the receiving service 110. In another aspect, each sending service 130 may be directly and/or indirectly connected to other sending services 130, and each sending service 130 may call services from other services depending on the computing services needed by the sending service.

In one aspect, the sending services 130 and the receiving service 110 may send/receive messages and/or API calls via one or more message channels 150. In an additional aspect, the sending services 130 and the receiving service 110 may send/receive feedback messages via one or more feedback message channels 160. The feedback message channels 160 may also function as throttling channels. In one aspect, the feedback can be a network message sent back to the sending services 130 and/or receiving service 130, and the network message may be an API call. Alternatively, the network message may be a remote procedure calls, IP packets with instructions, or another custom network communication protocol.

For example, in one aspect, the group of services may be linked together, which may include having one or more tiers or layers (e.g., an arrangement of $N^{th}$ tiers or layers, where N is a positive integer). For example, one or more sending services 130a may be defined in a first tier and may be connected directly connected to the receiving service 110. One or more sending services 130b may be defined in a second tier and may be directly connected to the first tier (e.g., sending service 130a) and indirectly connected to the receiving service 110 via sending service 130a. One or more sending services (not shown) may be defined in a third tier and directly connected to the second tier (e.g., sending service(s) 130b), but indirectly connected to sending service(s) 130a via sending service(s) 130b, and indirectly connected to the receiving service 110 via sending service(s) 130b and sending service(s) 130a.

In operation, by way of example only, the receiving service 110 may manage the rate at which one or more service message requests are sent to the receiving service 110 using the message rate comparison module 112, the message rate monitor module 114, the feedback response module 116, and/or the message rate throttle module 118 to perform one or more of the following. For example, in one aspect, 1) a current rate of service message requests received at the receiving service 110 may be monitored, using the message rate monitor module 114, 2) the current rate of service message requests (e.g., API calls) may be compared to an allowable rate of service message requests, using the message rate comparison module 112, 3) a message may be sent to one or more sending services to adjust the number of service message requests sent to the receiving service 110, using the feedback response module 116, and 4) the sending services 130 and/or the receiving service 120 may throttle up and/or throttle down the service message requests sent to the API, using the message rate throttle module 118.

In one aspect, the allowable rate of service message requests can be defined as K number of service message request (e.g., API calls) per second per a selected period of time, where K is a positive integer. If more than K messages per second are received at the receiving service 110 and the receiving service 110 cannot process that many messages at a time, then the receiving service can send an upstream throttling message, through a throttling communication channel to ask one or more sending services to send fewer messages.

In one aspect, the throttle down operation may include increasing delays between each service message request (e.g., API calls) sent to the receiving service 110. For example, a selected time period may be required to pass prior to sending the next service message request. In one aspect, the throttle up operation may include decreasing delays between each service message request (e.g., API calls) sent to the receiving service 110 and/or sent from one sending service 130, such as sending service 130c, to an alternative sending service, such as sending service 130b. For example, the selected time period may be reduced or shortened for decreasing the amount of wait time prior to sending the next service message. In one aspect, the throttle up operation may allow each sending service to send as many as possible service message requests to the receiving service 110.

In another aspect, the throttling down operation may include a back off operations. For example, in one aspect, the throttle down operation can include a back off operation where service message requests sent from a sending service 130 to the receiving service 110 (or to other sending services) may be delayed or exponentially delayed each time a further request is received for throttling within a defined time period. For example, in one aspect, the delay of service message requests (e.g., API calls) may be a back off operation that occurs for a first time period and each subsequent delay of the service message requests (e.g., API calls) may be exponentially larger then the most recent delay (e.g., the most recent back off operation) of the service message requests (e.g., API calls).

In an additional aspect, the throttling down operation may include back off operations where service message requests sent from a first sending service 130, such as sending service 130a, to the receiving service 110 may be delayed for a first selected time period. However, the service message requests sent from a second sending service 130, such as sending service 130a, may be one delayed for a second selected time period, where the second selected time period may be equal to, greater than, and/or exponentially larger than the first time period. Furthermore, each sending service 130, such as sending service 130c, may be delayed for a selected time period (T), where the selected time period (T) may be equal to, greater than, and/or exponentially larger than the second time period and/or the first time period, where T is a positive integer. Thus, the sending of messages from the sending services may be staggered out or spread out in time in response to a throttling message.

It should be noted that the sending service 130 and the receiving service 110 can each send and/or receive the service request messages (e.g., API calls) depending on the perspective of the service and the terms "sending" and/or "receiving" are used for illustration purposes and should not be construed to limit the functionality and capabilities of the services (e.g., sending service 130 and receiving service 110).

In one example configuration, the protocol used for the API calls may be a representation state transfer ("REST") API. Similarly, the services may use a software application that communicates: over HTTP (Hyper Text Transfer Protocol), using XML (extensible Markup Language) standards including SOAP (Simple Object Access Protocol), WSDL (Web Services Description Language), JavaScript Object Notification (JSON), and/or UDDI (Universal Description, Discovery, and Integration). In one aspect, the service or web service may refer to an application that can be invoked through the Internet. Also, the web services, for example, may include computing services, networking services, content delivery services, database services, deployment services, management services, applications services, and the like. The API may be responsible for managing requests and responses between the sending service and the receiving service. In one aspect, the API may also be a customer defined API.

Thus, by using the components, modules, devices, and/or services provided in FIG. 1, the present technology provides solutions for systems, which may not otherwise have autoscale or self-protection functionality when the system receives one or more service message requests beyond the ability of the service to handle each in coming service request. Thus, the receiving services can provide information how each sending services should interact with the receiving service, and how to interact with each other sending services, for creating an optimized system, such as providing upstream (or possibly downstream) backpressure on one or more sending services. Thus, each downstream sending service may interact differently with the next service upstream in a chain of sending services. The receiving service 110 may manage the rate of service message requests sent to the receiving service 110 and how the sending services interact with each other and the receiving service by managing any given amount of traffic (e.g., load) placed upon one or more other services (e.g., web services). The information provided by the receiving service 110 to the sending services 130 may include information to throttle up or down a rate of sending service message requests. The throttling information may also include information to buffer service message requests, cache service message requests, and/or apply backpressure to one or more upstream sending services linked to the sending services, where the backpressure controls (e.g., reduces) the flow, rate, and number of service message requests sent from a sending service farther upstream.

For example, if a first sending service is receiving backpressure from a downstream receiving service to control the rate of service message requests sent to the downstream receiving service, the first sending service may notify and apply backpressure to a second upstream sending service to control the rate of service message requests sent to the first sending service. Alternatively, if the first sending service is receiving backpressure from the receiving service and/or from a second upstream sending service in the chain of service calls to control the rate of service message requests sent to the receiving service, the first sending service may notify and apply backpressure to a second sending service to control the rate of service message requests sent to the first sending service.

The services illustrated in FIG. 1 may be composed of a number of endpoints which support a front end server for the service. The front end server may receive API requests and then send the requests on to an endpoint for processing of the request. For example, an endpoint may be provided to execute service message requests (e.g., API calls) issued to and/or received by the API service (e.g., a receiving service). An endpoint may have a uniform resource locator (URL) that may be an entry point for the web service. In other words, the endpoint may have a URL that identifies a host and port as the entry point for the endpoint, which may perform the work for the API service (the term API interface may also be used interchangeably here for API service). One or more regional endpoints may also be provided to enable faster connectivity. The endpoint may be a web server, which may be addressed with the URL, and may be in one or more locations, such as in a similar location of the web service and/or geographically remote from the web service. The endpoint or web server may execute and perform one or more API calls through the API service provided by a web server. The API service may issue a call to the endpoint to perform some function or request and the endpoint may return a result through the API service to the customer, such as another service, a mobile application, mobile device, and/or an on-premise application.

Figure 2:
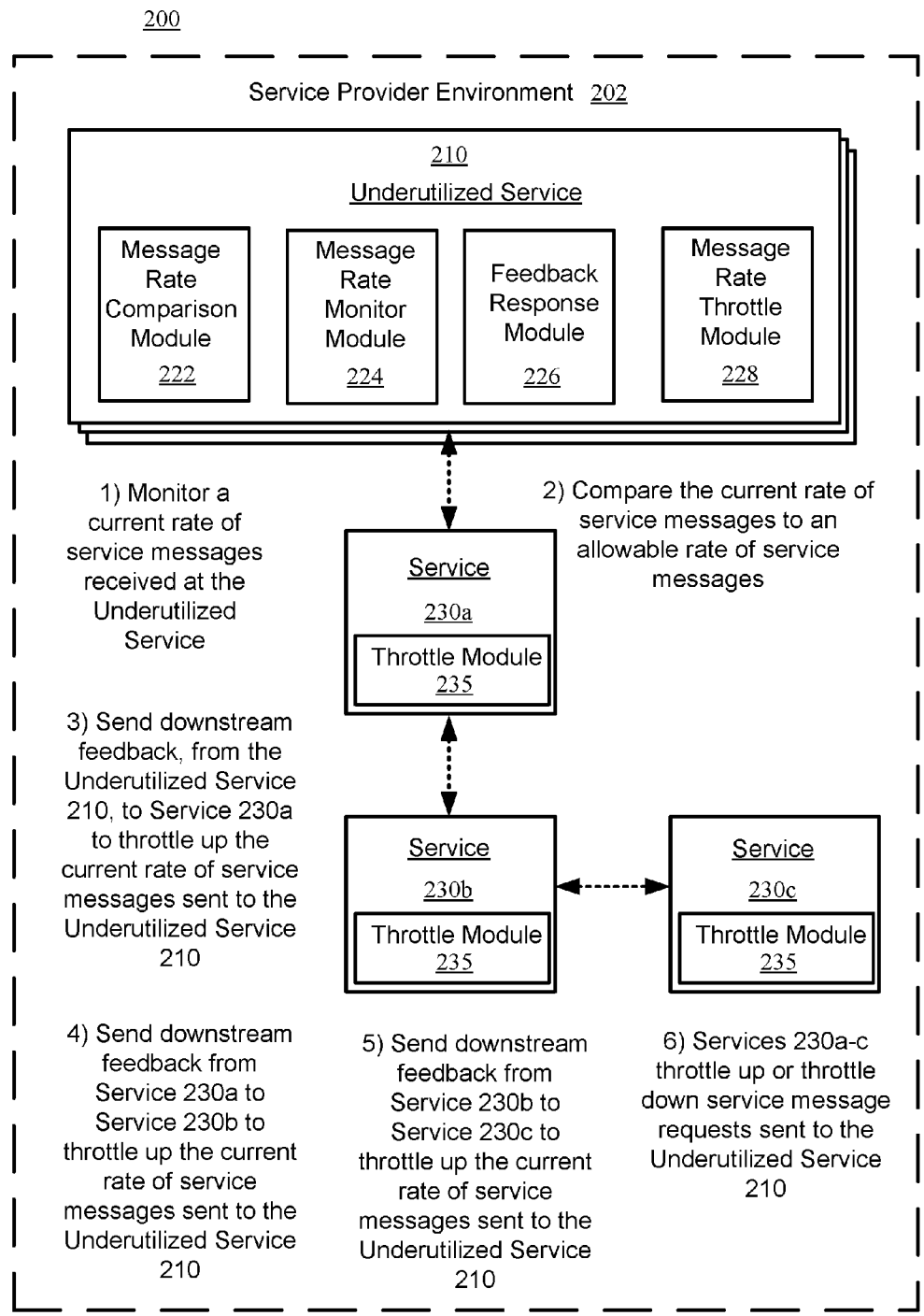
FIG. 2 illustrates a system for sending downstream messages to one or more services in a group of services for managing a rate of service message requests sent between services in a service provider environment according to an example of the present technology.

FIG. 2 illustrates the system 200 for sending upstream messages to one or more services in a group of services for managing a rate of service message requests sent between services in a service provider environment. In one aspect, each of the components, modules, and/or services described in FIG. 1 may also apply to the components, modules, and services of FIG. 2. Also, one or more of the operations and steps of FIG. 1 may also be included in one or more operations or actions of FIG. 2.

Similar to FIG. 1, the system 200 may include one or more requesting services (illustrated in FIG. 2 as 230a-c and may be individually and/or collectively referred to as "230"), a service (aka "an observer service") 210 (e.g., and/or may be referred to as a "underutilized service" indicating the underutilized service 210 is being underutilized and is not at a maximum usage), and a service provider environment 202, which may provide virtualized computing services (i.e., virtualized computing, virtualized storage, virtualized networking, etc.) to the service 230 (e.g., customers). More specifically, the service provider environment 202 may provide virtualized computing, virtualized storage, virtualized networking and other virtualized services that are executing on a hardware substrate. Also, the service provider environment 202 provide data communication between the one or more supplier services 230, which may occur by way of the network (not show) that may include a virtual network that is within the service provider environment 202 or other suitable networks, etc. The service provider environment 202 may include an application programming interface (API) gateway and the underutilized service 210. The underutilized service 210 may include a message rate comparison module 212, a message rate monitor module 214, a feedback response module 216, and/or message rate throttle module 218. In one aspect, the underutilized service 210 may provide a service message request rate management functionality in service provider environment 202.

It should be noted that in one aspect, the underutilized service 210 may be included within the service provider environment 202 and/or remotely located from the service provider environment 202. Also, one or more services 230 may be included within the service provider environment 202 and/or remotely located from the service provider environment 202. (The dashed line of the service provider environment 202 is depicted to illustrate the flexibility of the one or more components described herein to be internal and/or external to the service provider environment.) In one aspect, an API Gateway may be provided for the service provider environment 202 to receive service messages (e.g., API calls) from one or more services 230 and to pass the service messages on to the underutilized service 210. In one aspect, customers may configure the API Gateway, such as by creating the APIs, defining resources within the API Gateway, and the methods for resources of the API.

The services 230 may be a group of services, such as a group of federated services. Each service 230 may also include a throttle module 235 for throttling up and/or throttling down a number of service message requests (e.g., API calls) sent to the underutilized service 210, which may use an API Gateway. In one aspect, each service 230 may be directly connected to the underutilized service 210. In another aspect, each service 230 may be directly and/or indirectly connected to other services 230.

For example, in one aspect, the group of services may be linked together, which may include having one or more tiers or layers (e.g., an arrangement of $N^{th}$ tiers or layers, where N is a positive integer). For example, one or more services 230a may be defined in a first tier and may be connected directly connected to the underutilized service 210. One or more services 230b may be defined in a second tier and may be directly connected to the first tier (e.g., service 230a) and indirectly connected to the underutilized service 210, via service 230a. One or more services 230c may be defined in a third tier and directly connected to the second tier (e.g., sending service(s) 230b), but indirectly connected to sending service(s) 230a via sending service(s) 230b, and indirectly connected to the underutilized service 210 via sending service(s) 230b and sending service(s) 230a.

For example, in operation, FIG. 2 may include 1) a current rate of service message requests received at the API may be monitored, using the message rate monitor module 224, 2) the current rate of service message requests (e.g., API calls) may be compared to an allowable rate of services, using the message rate comparison module 222, 3) a message may be sent upstream, from the underutilized service 210 using the feedback response module 226, to one or more requesting services, such as to service 230a, to adjust the rate and/or number of service message requests sent to the underutilized service 210 (i.e., the rate being a number of service message requests sent to the underutilized service 210 per a selected time period), 4) a message may be sent downstream, from the service 230a, to one or more services 230, such as to service 230b, to adjust the rate and/or number of service message requests sent to the underutilized service 210, 5) a message may be sent downstream, from the service 230b, to one or more requesting services, such as to service 230c, to adjust the rate and/or number of service message requests sent to the underutilized service 210, and/or 6) each of the services 230, such as services 230a-c, each throttle up and/or throttle down the service message requests sent to the underutilized service 210.

It should be noted that each message may include analyzed metadata and information for controlling the rate and/or number of service message requests sent to the API Gateway. That is, the metadata may be analyzed to detect feedback and/or requests to control, adjust, and/or throttle messages.

In one aspect, each sending service may be ranked and/or placed in tiers by the underutilized service 210. Thus, the ranked or tiered services may throttle down the service message requests (e.g., API calls) according to the ranking. For example, a first service 230a may rank higher than a second service 230b, and a second service 230b may rank higher than a third service 230c. Accordingly, the messages sent to the first service 230a from the underutilized service 210 may indicate the number of service message requests to throttle according to a first defined rate and/or first selected time period that must expire prior to sending the next service message request. The message sent to the second service 230b from the first service 230a may indicate an alternative number of service message requests to throttle according to a second defined rate and/or second selected time period that must expire prior to sending the next service message request, where the second defined rate and/or second selected time period is different than the first defined rate and/or first selected time period. Also, the message sent to service 230c from service 230b may indicate an alternative number of service message requests to throttle according to a "$I^{th}$" defined rate and/or "$I^{th}$" selected time period that must expire prior to sending the next service message request, where the $I^{th}$ defined rate and/or $I^{th}$ selected time period is different than the first and second defined rate and/or first and second selected time period, where "I" is a positive integer.

Figure 3A:
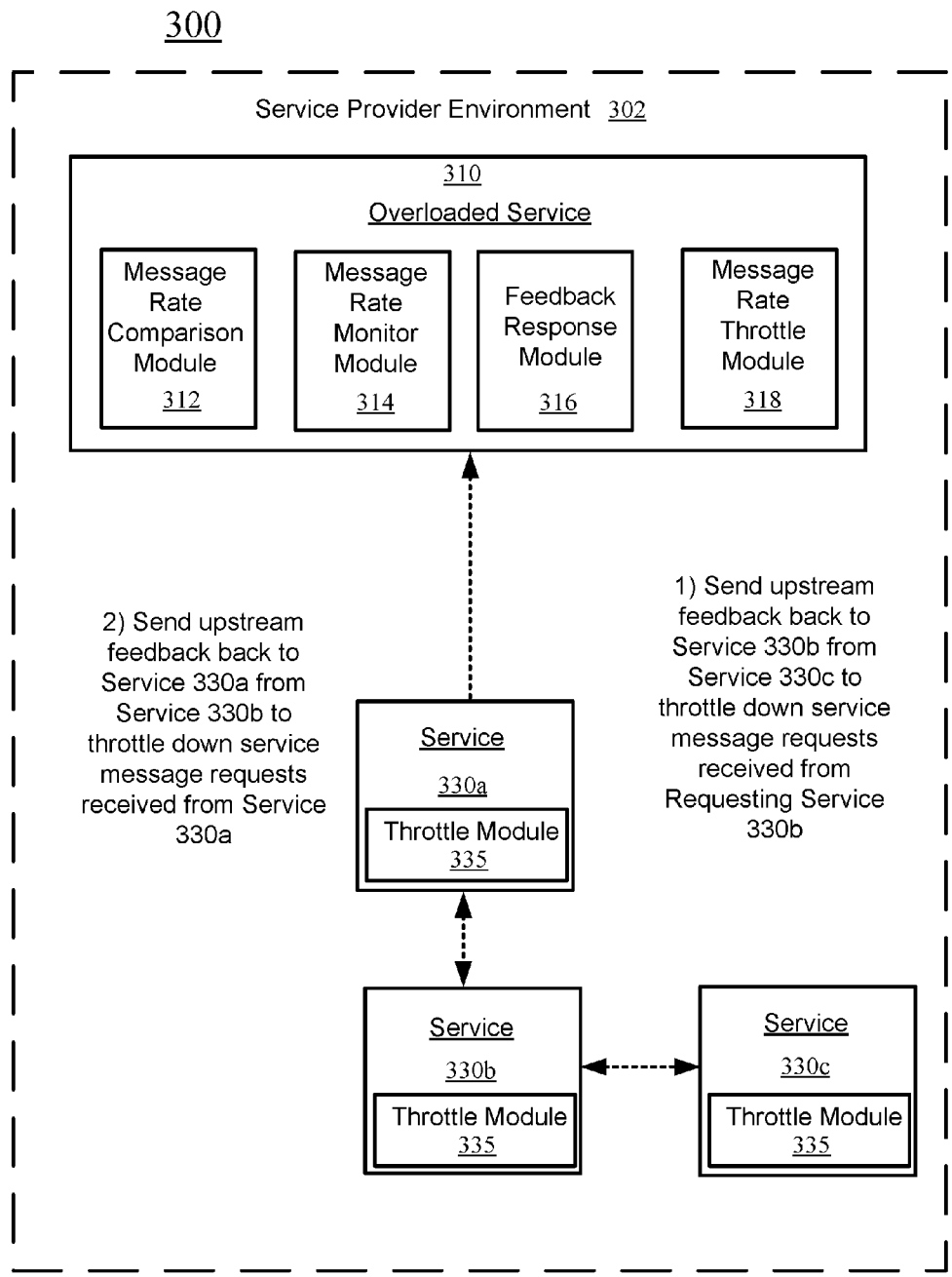
FIG. 3A illustrates a system for sending upstream feedback to one or more services in a group of services for managing a rate of service message requests sent between services in a service provider environment according to an example of the present technology.

FIG. 3A illustrates the system 300 for sending upstream feedback to one or more services in a group of services for managing a rate of service message requests sent between a group of services in a service provider environment according to an example of the present technology. In one aspect, each of the components, modules, and/or services described in FIGS. 1-2 may also apply to the components, modules, and services of FIG. 3A. Also, one or more of the operations or actions of FIGS. 1-2 may also be included in one or more operations or actions of FIG. 3A.

Similar to FIGS. 1-2, the system 300 may include one or more may include one or more requesting services (illustrated in FIG. 3A as 330a-c and may be individually and/or collectively referred to as "330"), a supplier (aka "an observer service") 310 (which also may be referred to as a "overloaded service" since the service may be a maximum capacity for functioning, processing, and/or sending/receiving service requests), and a service provider environment 302, which may provide virtualized computing services (i.e., virtualized computing, virtualized storage, virtualized networking, etc.) to the service 330 (e.g., customers). Also, the service provider environment 302 may be in data communication with the one or more services 330, which may occur by way of the network (not shown) that may include a virtual network that is within the service provider environment 302 or other suitable networks, etc. The service provider environment 302 may include an application programming interface gateway and an over loaded service 310. The overloaded service 310 (which may also be referred to as a "observer service") may include a message rate comparison module 312, a message rate monitor module 314, a feedback response module 316, and/or message rate throttle module 318. In one aspect, the overloaded service 310 may provide a service message request rate management functionality in service provider environment 302.

It should be noted that in one aspect, the overloaded service 310 may include an API management service to manage API calls (e.g. service requests). The overloaded service 310 may be included within the service provider environment 302 and/or remotely located from the service provider environment 302. Also, one or more services 330 may be included within the service provider environment 302 and/or remotely located from the service provider environment 302. (The dashed line of the service provider environment 202 is depicted to illustrate the flexibility of the one or more components described herein to be internal and/or external to the service provider environment.)

In one aspect, the service provider environment may use an API Gateway for the service provider environment 302 to receive service messages (e.g., API calls) from one or more services 330. In one aspect, customers may configure the overloaded service, such as by creating the APIs, defining resources within the API, and the methods for resources of the API.

In one aspect, the services may be a group of services, such as a group of federated services. Each service 330 may also include a throttle module 335 for throttling up and/or throttling down a number of service message requests (e.g., API calls) sent to the API Gateway. In one aspect, each service 330 may be directly connected to the API Gateway. In another aspect, each service 330 may be directly and/or indirectly connected to other services 330.

For example, in one aspect, the group of services may be linked together, which may include having one or more tiers or layers (e.g., an arrangement of Nth tiers, where N is a positive integer). For example, one or more services 330a may be defined in a first tier and may be connected directly connected to the API Gateway. One or more services 330b may be defined in a second tier and may be directly connected to the first tier (e.g., service 330a) and indirectly connected to the API Gateway via service 330a. One or more services 330c may be defined in a third tier and directly connected to the second tier (e.g., sending service(s) 330b), but indirectly connected to sending service(s) 330a via sending service(s) 330b, and indirectly connected to the API via sending service(s) 330b and sending service(s) 330a.

In operation, FIG. 3A may include 1) sending upstream feedback from a first sending service, such as service 330c, to a second sending service, such as service 330b, to throttle down service message requests (e.g., API calls) received from the second sending service (e.g., service 330b), and/or 2) sending upstream feedback from the second sending service, such as service 330b, to an "Nth" sending service, such as service 330a, to throttle down service message requests received from the Nth sending service (e.g., service 330a), where N is a positive integer.

For example, consider that the first service 330c may be unable to service the number of requests needed from the second service 330b, service 330a, and/or the overloaded service 310. The first service 330c may issue to a request to throttle down service message requests sent to the third service 330c by the second service 330b, the first service 330a, and/or the overloaded service 310.

For example, applying one or more operations of FIGS. 1-3A (for purposes of this example the numbering of FIG. 3A will be used) consider that a first service 330c is receiving feedback information from a second service 330b to decrease the current rate of service message requests sent to either the API Gateway or service 330b. However, assume that service 330c has reached a point where the service 330c is overwhelmed with service message requests received from services 330b. Thus, services 330c may send feedback information, as part of a message that is intended to satisfy one or more service message requests received from services 330b, that indicates services 330c has reached a "warning state" and services 330c may fail any further service message requests sent from the services 330b to services 330c. Thus, the feedback sent from services 330c to services 330b may indicate to services 330b to throttle down the rate of service message requests sent to services 330c for a selected period of time.

In an alternative example, consider that service 330c is receiving feedback information from service 330b to increase the current rate of service message requests sent to either the overloaded service 310 or service 330b. Assume that services 330b may be operating in a "safe mode state" (e.g., a normal operation state) where services 330b may be capable of increasing the amount of service message requests received from services 330c. Thus, service 330c may receive feedback information that indicates to service 330c to throttle up the current rate of service message requests sent to services 330b. Sending service 330b may also throttle up the current rate of service message requests sent to services 330a, assuming services 330a may provide feedback to services 330b to throttle up the current rate of service message requests sent from services 330b to services 330a. However, if at any point in time the overloaded service 310 detects that the current rate of service message requests received at the overloaded service 310, by one or more of the services 330, is greater than an allowable rate of service message requests, the overloaded service 310 may send an message either directly or indirectly to one or more of the requesting services to throttle down the current rate of service message requests sent to the overloaded service 310. In one aspect, the rate at which each requesting services throttles up and/or down the number of service message requests send to the overloaded service 310 and/or an upstream or downstream service 330 may also be dependent on the ranked priority of the individual service 330.

For example, assuming that service 330a is ranked higher than service 330b and service 330b is ranked higher than service 330c. Accordingly, the message sent from the overloaded service 310 to service 330a may indicate to send X service message requests per selected period of time to the overloaded service 310, where X is a positive integer. The message sent directly or indirectly (e.g., via service 330a) from the overloaded service 310 to service 330b may indicate to service 330b to send Y service message requests per selected period of time to the overloaded service 310, where Y is a positive integer and equal to or less than X. The message sent directly or indirectly (e.g., via service 330b) from the overloaded service 310 to service 330c may indicate to service 330c to send Z service message requests per selected period of time to the overloaded service 310, where Z is a positive integer and equal to or less than Y.

Figure 3B:
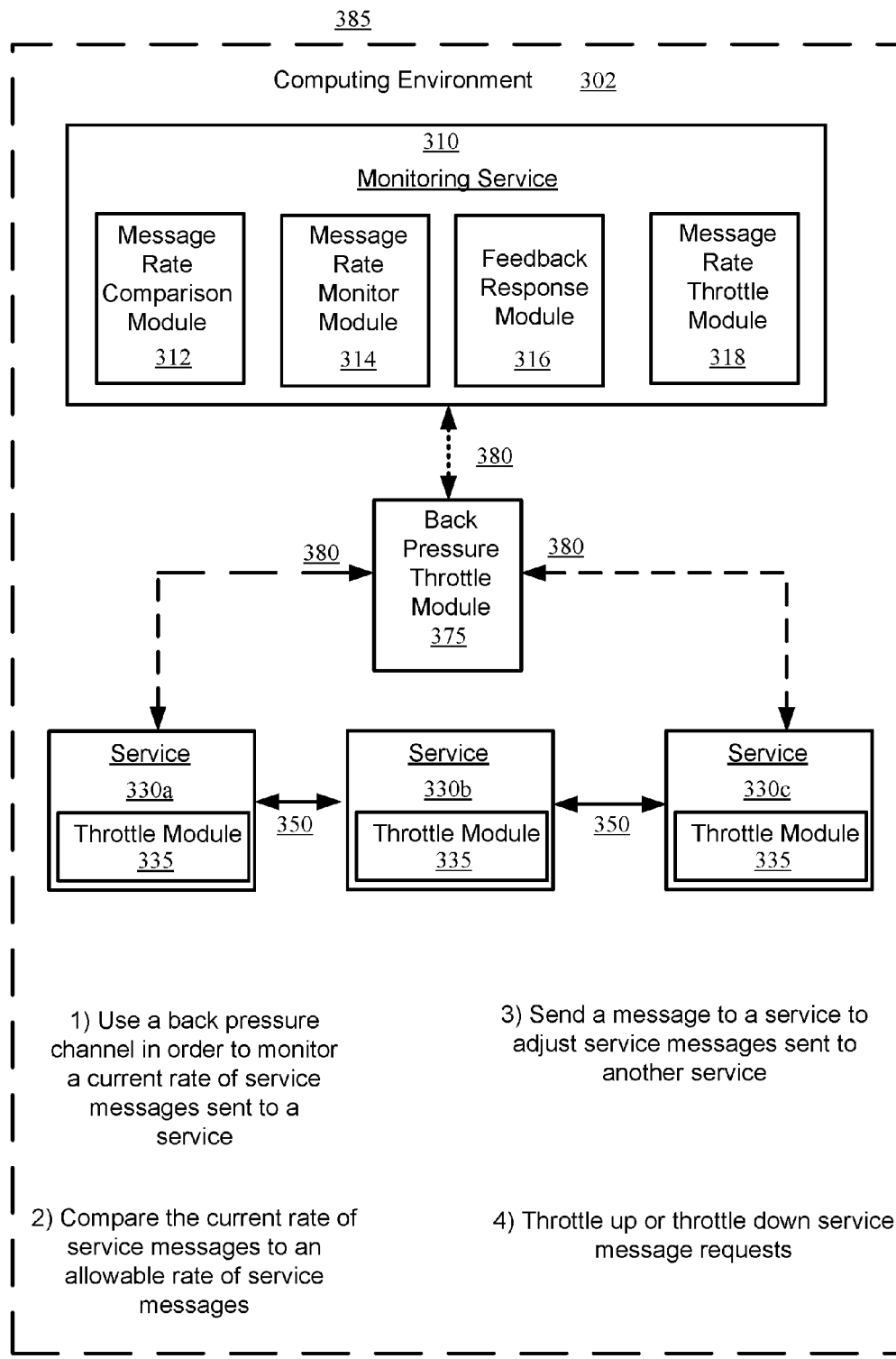
FIG. 3B illustrates a system for centralized managing of a rate of service messages using a back pressure channel for services in a service provider environment according to an example of the present technology.

FIG. 3B illustrates a system for managing a rate of service messages using a back pressure channel for services in a service provider environment according to an example of the present technology.

Similar to FIGS. 1-3A, the system 385 may include one or more services (illustrated in FIG. 3B as 330a-c and may be individually and/or collectively referred to as "330"), a monitoring service (aka "an observer service") 310, and a service provider environment 302, which may provide virtualized computing services (i.e., virtualized computing, virtualized storage, virtualized networking, etc.) to the service 330 (e.g., customers). The monitoring service 310 (which may also be referred to as an "observer service") may include a message rate comparison module 312, a message rate monitor module 314, a feedback response module 316, and/or message rate throttle module 318. In one aspect, the monitoring service 310 may provide service message request rate management functionality in a service provider environment 302.

In one aspect, the monitoring service 310 may be in communication with a back pressure throttle module 375 via one or more back pressure channels 380. The back pressure throttle module 375 may be included with and/or be external to the monitoring service 310. The back pressure throttle module 375 may be in communication with each service 330 via the one or more back pressure channels. More specifically, the back pressure throttle module 375 may be in direct communication with the throttle module 335 of each service 330 and the message rate throttle module 318 of the monitoring service 310. The back pressure throttle module 375 may function as a manager for each throttle module 335 and indicate to each service via the throttle module 335 to increase and/or decrease the service message rate sent to and/or received from another service 330. In one aspect, the back pressure channel 380 may be able to monitor each message channel 350 and read, analyze, and/or process each service message request sent to and/or received from another service via the message channel 350. The monitoring service 310 can function as a "super manager" to collect, process, and analyze data of the back pressure throttle module 375 and to further instruct or program the back pressure throttle module 375.

For example, assume service 330a may be sending a service message request via the message channel 350 to service 330b and service 330b is sending a service message request via the message channel 350 to service 330c. The back pressure module 375 using the back pressure channel may read and/or analyze the service message request. The back pressure throttle module 375, in conjunction with the monitoring service 310, may 1) use the back pressure channel to monitor a current rate of service message requests sent to and/or received from one service 330 to an alternative service 330, such as service 330a sending to service 330b and/or service 330b sending to service 330c. 2) The current rate of service message requests (e.g., API calls) may be compared to an allowable rate of service message requests, using the message rate comparison module 312. The backpressure throttle module 375 may provide the monitoring service 310 with information relating to each service request sent over the back channels 380. 3) A message may be sent, via the back pressure channel 380, as indicated by the back pressure throttle module 375, to one or more services 330 to adjust the number of service message requests sent to another service 330. For example, the monitoring service 310 may determine that the current rate of service messages for the service 330c exceeds the allowable rate of service message. As such, the back pressure throttle module 375 may indicate to service 330b to throttle down a number of service message requests sent to service 330c. Alternatively, the monitoring service 310 may determine that the current rate of service message for the service 330b is less than the allowable rate of service message. As such, the back pressure throttle module 375 may indicate to service 330a and/or service 330c to throttle up the number of service message requests sent to service 330b. The services 330 may 4) throttle up and/or throttle down the service message requests sent to another service 300.

Figure 4:
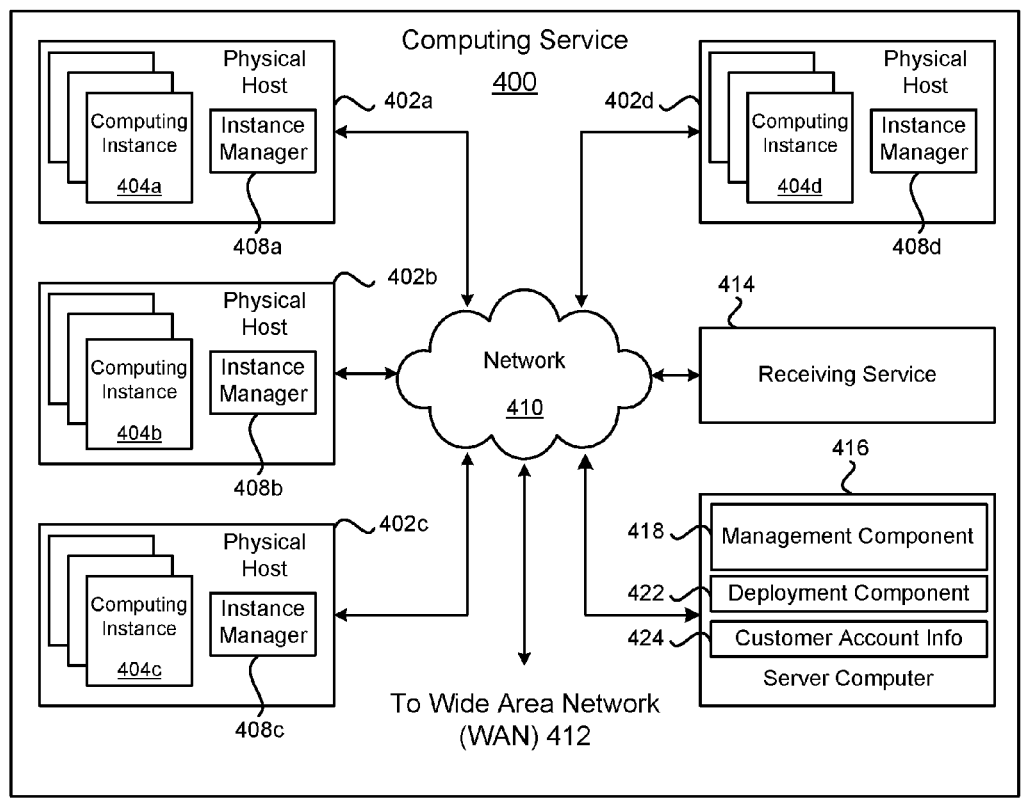
FIG. 4 is a block diagram that illustrates an example computing service environment that includes a receiving service according to an example of the present technology.

FIG. 4 is a block diagram illustrating an example computing service 400 that may be used to execute software services for providing a service message request rate management functionality in a computing service environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for executing a service message request rate management operation service (e.g., service message rate throttling or auto-scaling operation service). For example, a server computer 414 may execute a receiving service in a computing service environment. For example, the receiving service may act as the API call node and use computing instances 404a-c as the sending service nodes or the receiving service may use a computing instance 404a-c as the API node which communicates with other sending service nodes that are computing instances 404a-c.

One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache may be prepared, and other types of information. The deployment component 422 may utilize the customer-provided configuration and cache logic to configure, initialize, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
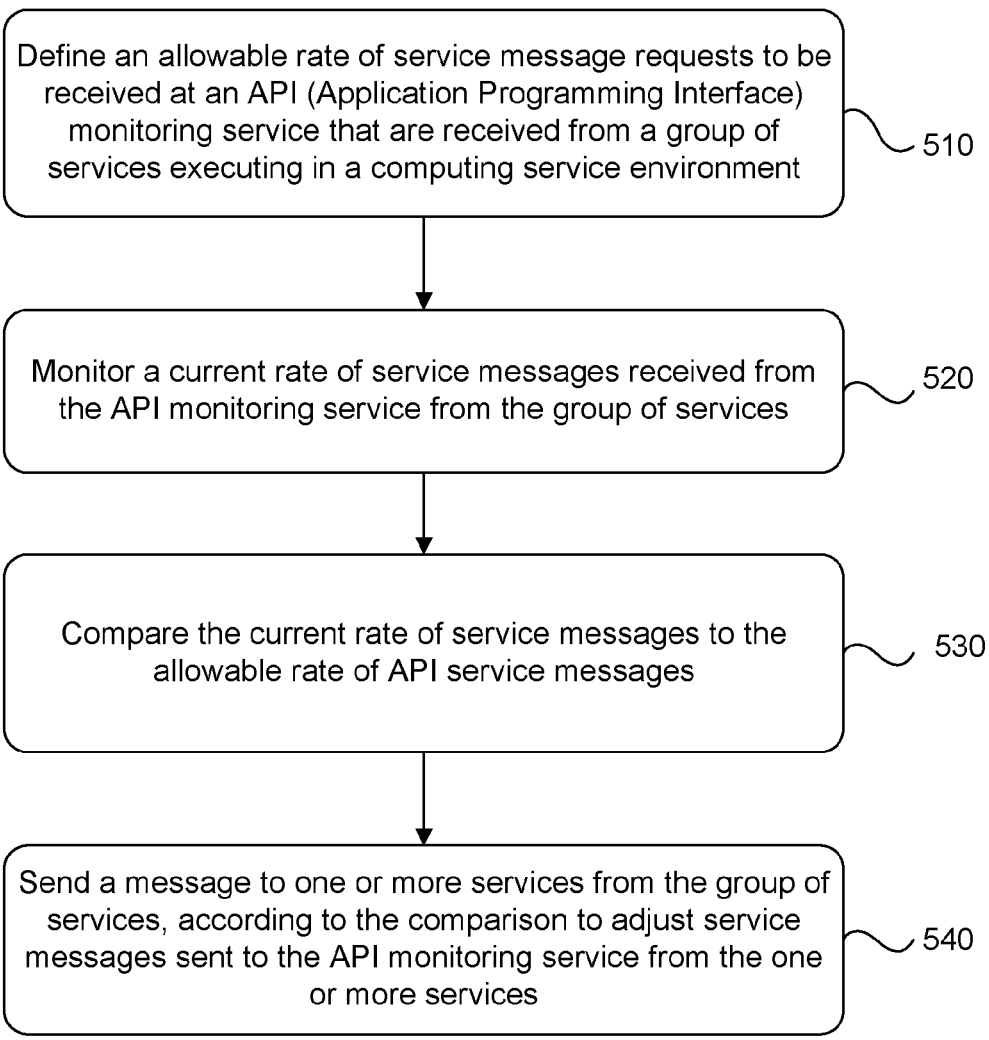
FIG. 5 is a flowchart of an example method for managing a rate of service message requests sent between services in a service provider environment according to an example of the present technology.

FIG. 5 is a flowchart of an example method 500 for managing a rate of service message requests sent between a group of services in a service provider environment according to an example of the present technology. The functionality 500 may be implemented as a method and executed as instructions on a machine, where the instructions are included on at least one computer readable medium or one non-transitory machine-readable storage medium. For example, starting in block 510, allowable rate of service message requests to be received at an API (Application Programming Interface) gateway that are received from a group of services executing in a computing service environment may be defined. A current rate of service message requests received from the API gateway from the group of services may be monitored, as in block 520. The current rate of service message requests may be compared to the allowable rate of API service message requests, as in block 530. A message may be sent to a one or more services from the group of services, according to the comparison to adjust service message requests sent to the API gateway from the one or more services, as in block 540.

Figure 6:
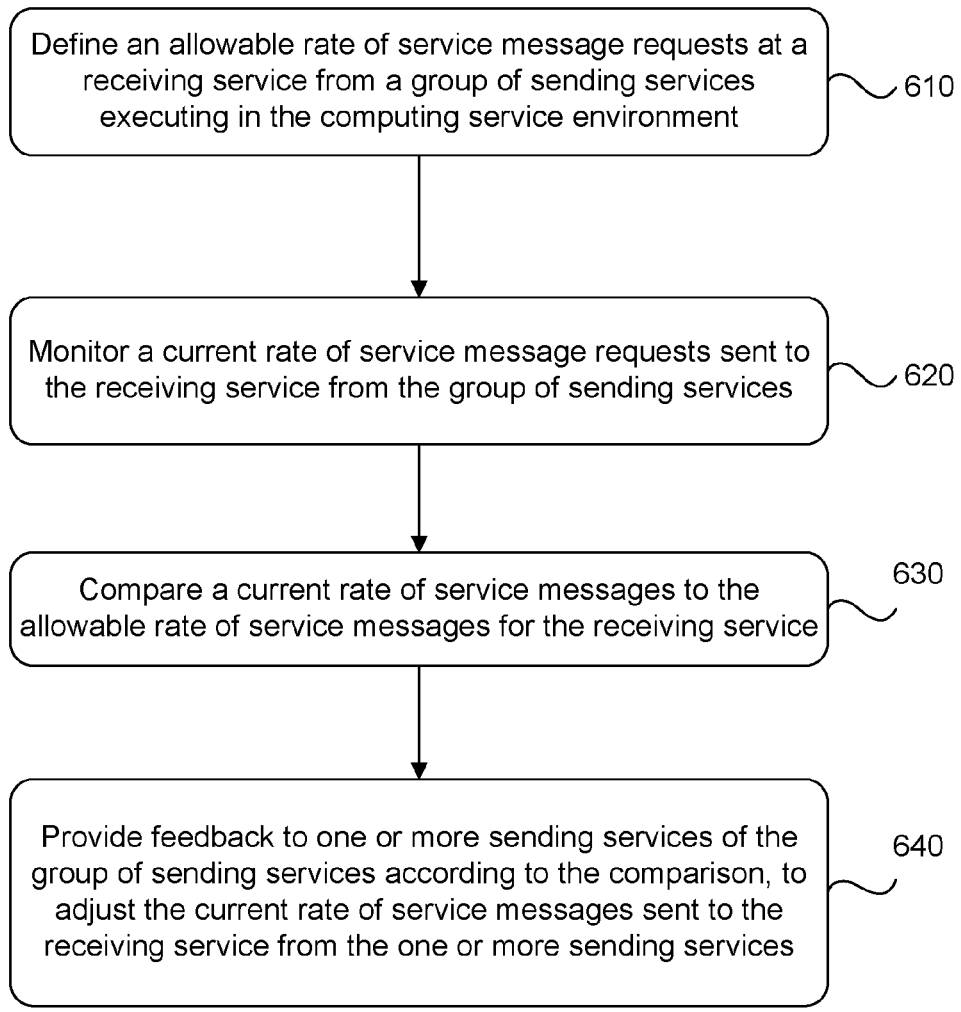
FIG. 6 is a flowchart of an additional example method for providing feedback to one or more services for managing a rate of service message requests sent between services in a service provider environment according to an example of the present technology.

FIG. 6 is a flowchart of an additional example method 600 for providing feedback to one or more services in a group of services for managing a rate of service message requests sent between a group of services in a service provider environment according to an example of the present technology. The functionality 600 may be implemented as a method executed as instructions on a machine, where the instructions are included on at least one computer readable medium or one non-transitory machine-readable storage medium. Starting in block 610, an allowable rate of service message requests at a receiving service from a group of sending services executing in the service provider environment may be defined. A current rate of service message requests sent to the receiving service from the group of sending services may be monitored, as in block 620. A current rate of service message requests (received at the receiving service) may be compared to the allowable rate of service message requests for the receiving service, as in block 630. Feedback may be provided to one or more sending services of the group of sending services according to the comparison, to adjust the current rate of service message requests sent to the receiving service from the one or more sending services, as in block 640.

Figure 7:
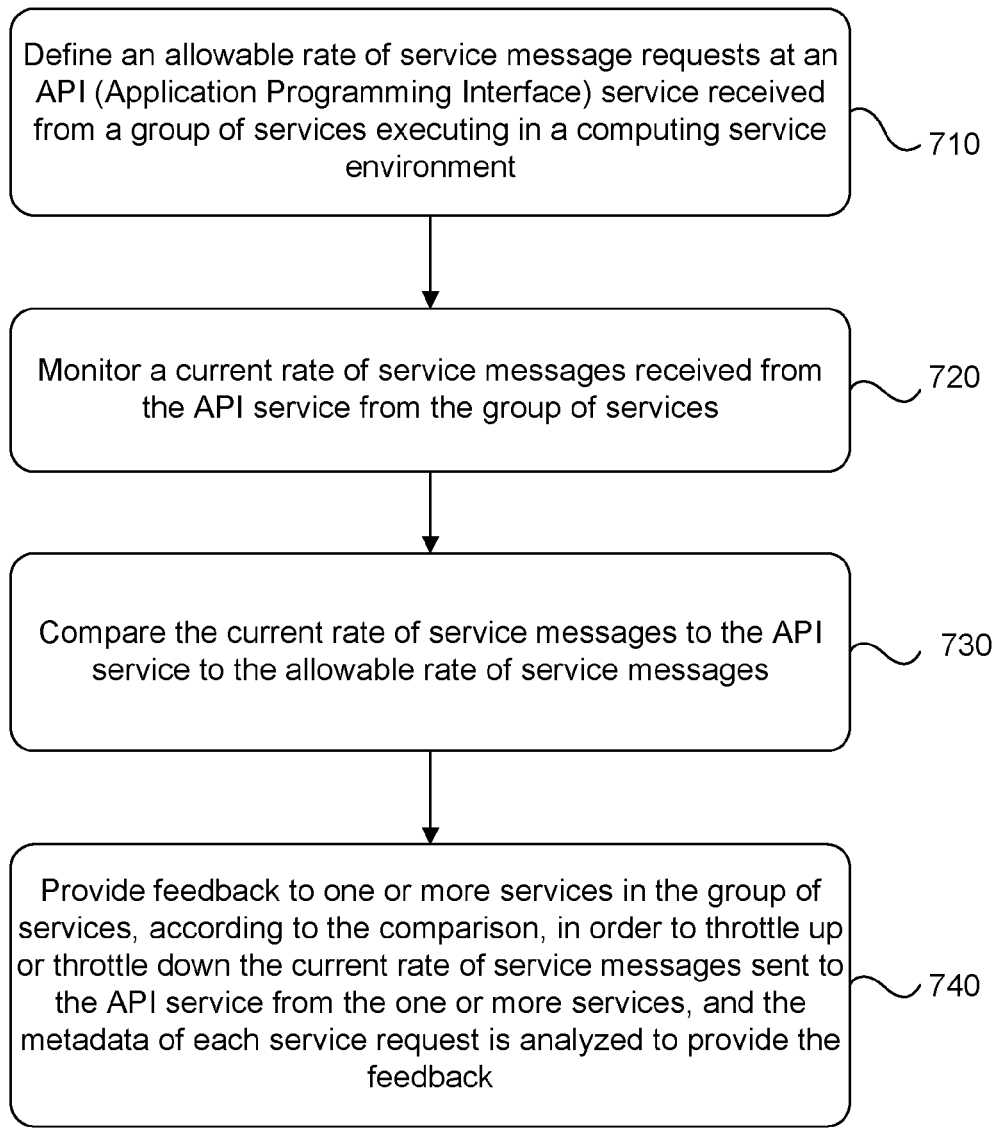
FIG. 7 is a flowchart of an additional example method for throttling service messages sent from one or more services in order to manage a rate of service message requests sent between a group of services in a service provider environment according to an example of the present technology.

FIG. 7 is a flowchart of an additional example method 700 for throttling service message sent to an API gateway from one or more services for managing a rate of service message requests sent between a group of services in a service provider environment according to an example of the present technology. The functionality may be implemented as a method executed as instructions on a machine, where the instructions are included on at least one computer readable medium or one non-transitory machine-readable storage medium. Starting in block 710, an allowable rate of service message requests at an API (Application Programming Interface) gateway received from a group of services, executing in the service provider environment, may be defined. A current rate of service message requests from the group of services may be monitored, as in block 720. The current rate of service message requests sent to the API gateway may be compared to the allowable rate of service message requests, as in block 730. Feedback may be provided to one or more services in the group of services, according to the comparison, in order to throttle up or throttle down the current rate of service message requests sent to the API gateway from the one or more services, and the metadata of each service request is analyzed to provide the feedback, as in block 740.

In one aspect, in conjunction with and/or as part of at least one block of FIGS. 5-7, the operations of 500, 600, and/or 700 may include each of the following. In one aspect, the operations of 500, 600, and/or 700 may include performing each of the following. In one aspect, the throttle up may be referred to as an exponentially increase, a predefined increase, or a selected increase and throttle down may be referred to as an exponentially decrease, a predefined decrease, or a selected decrease.

In one aspect, operations of 500, 600, and/or 700 may include throttling up a number of service message requests sent to the receiving service from the one or more sending services according to the comparison, which determines the current rate of service message requests is greater than the allowable rate of API service message requests. In one aspect, a number of the service message requests sent to the receiving service (e.g., an API gateway) from the one or more services according to the comparison, which determine the current rate of service message requests is less than the allowable rate of API service message requests. The current rate of service message requests sent to the receiving service may be buffered and/or cached.

Metadata of each service request sent to the receiving service may be analyzed to provide feedback to the one or more sending services in the group of sending services. The metadata of service requests may be used to indicate to the sending services of the group of sending services to adjust service message requests sent to the receiving service.

Feedback may be provide upstream from the receiving service (e.g., the API gateway) to the one or more sending services in the group of sending services for adjusting the current rate of service message requests sent to the receiving service. Feedback may also be provided downstream from the receiving service (e.g., the API gateway) to the one or more sending services in the group of sending services for adjusting the current rate of service message requests sent to the receiving service. Also, feedback may be provided downstream from the receiving service (e.g., the API gateway) to one or more Internet of thing (IoT) devices for adjusting the current rate of service message requests sent to the receiving service, wherein the one or more IoT devices are in communication with the sending services.

In one aspect, the service provider environment may include one or more services executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

In one aspect, the present technology provides for managing a rate of messages or interactions between services, such as web services, in a group of services and provide feedback to each web service indicating to the web service to slow down or speed up (e.g., using meta data or a communication hook) a number of messages sent between the one or more web services in a group of services messages so that the messages do not crash other services. In one aspect, the metadata sent to a web service via an API management service may launch a back off routine that is governed by the API management service system. In one aspect, messages may be queued to buffer the message rate. If necessary, an administrator may be notified of the buffering. A caching operation may be performed in conjunction with a throttling operation. In one aspect, some web services may be more rank (e.g., according to a degree of priority) and selectively throttle up and/or selectively throttle down messages linking between the services. Feedback may be provided downstream service to: upstream services, upstream servers, upstream clients, end user, mobile device, person computers (PC), and the like. This feedback can also tie back to IoT autonomous physical devices, such as heating ventilation air condition (HVAC), home automation, and the like, which may be remote and external to a service provider environment.

Figure 8:
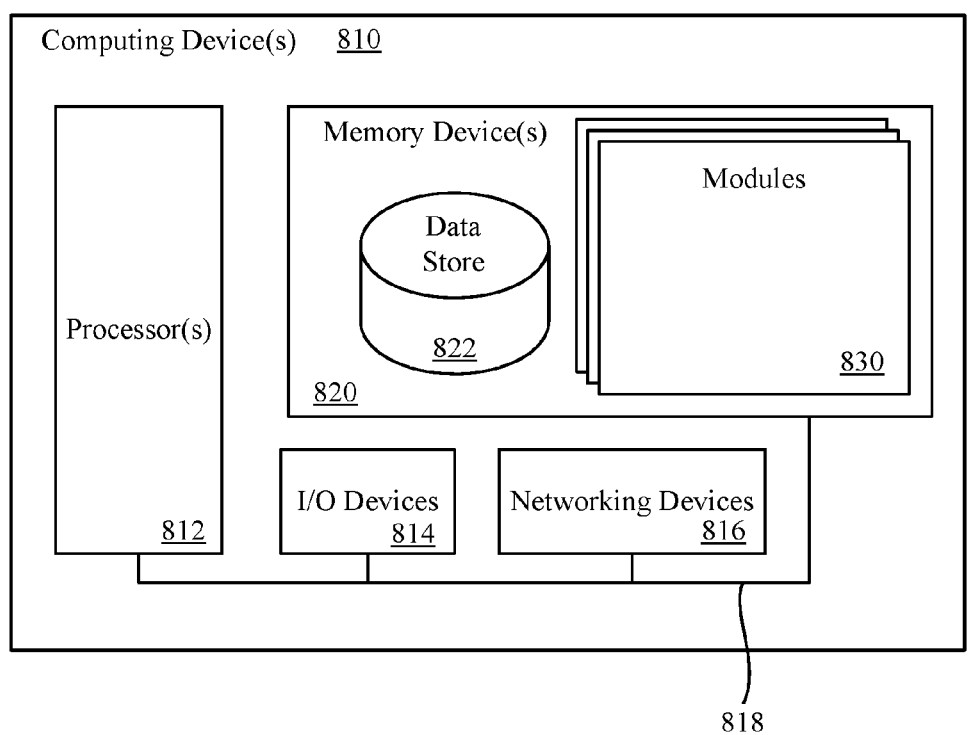
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for providing message rate management for a service in computing service environment, the method comprises:
    under control of at least one processor and memory configured with executable instructions that:
    define an allowable rate of service message requests to be received at a first service that are received from one or more services in a group of services executing in a computing service environment;
    monitor a current rate of service message requests received at the first service from the group of services;
    compare the current rate of service message requests received at the first service to the allowable rate of API service message requests; and
    send a message to the one or more services from the group of services, according to the comparison to adjust service message requests sent to the first service from the one or more services.

2. The method of claim 1, wherein the executable instructions further throttle up a number of the service message requests sent to the first service from the one or more services according to the comparison which determines the current rate of service message requests is greater than the allowable rate of API service message requests.

3. The method of claim 1, wherein the executable instructions further throttle down a number of the service message requests sent to the first service from the one or more services according to the comparison which determine the current rate of service message requests is less than the allowable rate of API service message requests.

4. The method of claim 1, wherein the executable instructions further:
    analyze metadata of service requests to provide feedback to the one or more services in the group of services;
    use the metadata of service requests to indicate to the one or more services of the group of services to adjust a rate of service message requests sent to the first service from the one or more services; and
    provide the feedback in the message sent to the one or more services from the group of services.

5. The method of claim 1, wherein the executable instructions further provide feedback upstream from the one or more services to other services in the group of services for adjusting the current rate of service message requests sent to the first service.

6. The method of claim 1, wherein the executable instructions further provide feedback downstream from the one or more services to other services in the group of services for adjusting the current rate of service message requests sent to the first service.

7. A method for managing a rate of service messages in a computing service environment, the method comprises executable instructions that:

define an allowable rate of service message requests at a receiving service from a group of sending services executing in the computing service environment;

monitor a current rate of service message requests sent to the receiving service from the group of sending services;

compare the current rate of service message requests to the allowable rate of service message requests for the receiving service; and provide feedback from the receiving service to one or more sending services of the group of sending services according to the comparison, to adjust the current rate of service message requests sent to the receiving service from the one or more sending services.

8. The method of claim 7, wherein the executable instructions further throttle up a number of service message requests sent to the receiving service from the one or sending services according to the comparison which determines the current rate of service message requests is greater than the allowable rate of service message requests.

9. The method of claim 7, wherein the executable instructions further throttle down a number of the service message requests sent to the receiving service from the one or more services according to the comparison which determine the current rate of service message requests is less than the allowable rate of service message requests.

10. The method of claim 7, wherein the executable instructions further analyze metadata of each service request sent to the receiving service to provide feedback to the one or more sending services in the group of sending services.

11. The method of claim 7, wherein the executable instructions further use metadata of service requests to indicate to the sending services of the group of sending services to adjust service message requests sent to the receiving service.

12. The method of claim 7, wherein the executable instructions further provide feedback upstream from the receiving service to the one or more sending services in the group of sending services for adjusting the current rate of service message requests sent to the receiving service.

13. The method of claim 7, wherein the executable instructions further provide feedback downstream from the receiving service to the one or more sending services in the group of sending services for adjusting the current rate of service message requests sent to the receiving service.

14. The method of claim 7, wherein the executable instructions further buffer the current rate of service message requests at a sending service prior to being sent to the receiving service.

15. The method of claim 7, wherein the executable instructions further provide feedback upstream from the receiving service to one or more internet of thing (IoT) devices for adjusting the current rate of service message requests sent to the receiving service, wherein the one or more IoT devices are in communication with the sending services.

16. A computer implemented method for managing service message requests in a computing service environment, the method comprises:

define an allowable rate of service message requests at a receiving service as received from a group of sending services executing in a computing service environment;

monitor a current rate of service message requests from the group of sending services;

compare the current rate of service message requests to the receiving service to the allowable rate of service message requests; and provide feedback to one or more sending services in the group of services, according to the comparison, in order to throttle up or throttle down the current rate of service message requests sent to the receiving service receiving service from the one or more sending services, and the metadata of each service request is analyzed to provide the feedback to the one or more sending services.

17. The method of claim 16, wherein the executable instructions further throttle up a number of the service message requests sent to the receiving service from the one or more sending services according to the comparison which determines the current rate of service message requests is greater than the allowable rate of service message requests.

18. The method of claim 16, wherein the executable instructions further throttle down a number of the service message requests sent to the receiving service from the one or more sending services according to the comparison which determine the current rate of service message requests is less than the allowable rate of service message requests.

19. The method of claim 16, wherein the feedback is a network message sent back to the sending service, wherein the network message is an API call.

20. The method of claim 16, wherein the network message is an API call.

* * * * *